US006393689B1

(12) United States Patent
Roshardt

(10) Patent No.: US 6,393,689 B1
(45) Date of Patent: May 28, 2002

(54) SYSTEM FOR FITTING PINS INTO A DEVICE SUCH AS, FOR EXAMPLE, A CONNECTOR

(75) Inventor: Christophe Roshardt, Thorigny (FR)

(73) Assignee: S. M. Contact, Quincy-Voisins (FR)

( * ) Notice: Subject to any disclaimer, the term of this patent is extended or adjusted under 35 U.S.C. 154(b) by 0 days.

(21) Appl. No.: 09/478,353

(22) Filed: Jan. 6, 2000

(30) Foreign Application Priority Data

Jan. 14, 1999 (FR) .......................................... 99 00320

(51) Int. Cl.[7] .......................... B23P 19/02; B23P 19/10; B21F 45/00

(52) U.S. Cl. ....................... 29/564.6; 29/837; 29/33 M; 29/739; 29/759; 29/845

(58) Field of Search ................................ 29/563, 33 M, 29/564.1, 564.3, 564.6, 739, 759, 837, 876, 845

(56) References Cited

U.S. PATENT DOCUMENTS 3,815,449 A * 6/1974 Folkenroth et al. .......... 81/9.51
4,176,448 A 12/1979 Zahn et al.
4,206,861 A 6/1980 Brown
4,265,013 A * 5/1981 Brown et al. ................. 29/739
4,318,964 A 3/1982 Zahn et al.
4,519,534 A * 5/1985 White ........................ 227/117
4,590,659 A * 5/1986 Yagi et al. ................. 29/564.6
4,612,700 A * 9/1986 Loomis et al. ............. 29/564.6
4,658,503 A * 4/1987 Eaton .......................... 29/854
4,763,400 A 8/1988 Deckers
4,836,006 A 6/1989 Brown
5,206,985 A * 5/1993 Tsukihashi et al. ........... 29/720
5,504,990 A * 4/1996 Pittau ......................... 29/33 M
5,621,960 A * 4/1997 Kaminski .................. 29/564.1
5,701,662 A * 12/1997 Imai et al. ................. 29/564.6
5,832,597 A * 11/1998 Yokoyama et al. ........ 29/564.6

OTHER PUBLICATIONS

French Search Report dated Sep. 3, 1999.

* cited by examiner

*Primary Examiner*—A. L. Wellington
*Assistant Examiner*—Erica E Cadugan
(74) *Attorney, Agent, or Firm*—Stevens, Davis, Miller & Mosher, LLP

(57) ABSTRACT

A system for fitting pins into a connector, wherein the pins are formed by portions including an end portion of a continuous wire, which portions are arranged one after another and linked together by and separable at frangible regions. The continuous wire is fed to a first unit which advances the wire and guides the end portion of the wire in a rectilinear direction of advance toward a second unit. The second unit is mounted on a rotary shaft perpendicular to this rectilinear direction and rotated so that the end portion of the continuous wire is introduced into the second unit by the first unit and then the second unit is further rotated to cause separation of the end portion from the continuous wire by bending. The second unit then inserts the separated portion into the connector.

11 Claims, 8 Drawing Sheets

SYSTEM FOR FITTING PINS INTO A DEVICE SUCH AS, FOR EXAMPLE, A CONNECTOR

The present invention relates to a system for fitting pins into a device such as a connector, a printed circuit, a coil body, a transformer or, in general, any device capable of housing pins. In the application described below, albeit nonexclusive, the object of the system is to fit the pins into the holes in a connector.

The term "pin" includes any type of male or female electrical contact, intended to be fitted into a support or a socket in order to form, after the contacts have been inserted into the support, a complete electrical connector that can be fixed to an apparatus or terminate a cable.

The pins to be fitted, usually called "studs" by technicians before they are fitted, are put in place in the holes or cavities in the sockets in two different ways:

either by placing them in the holes in molds and by overmolding the pins with a suitable plastic of which the socket of the connectors to be obtained is composed;

or by forcibly inserting the pins into the holes provided in the plastic sockets, made beforehand.

Whatever way is used, rapid fitting of the pins is in any case necessary, this depending on the packaging of the pins. This is because the pins may be in loose form, be placed on a carry strip or be prepared in the form of prescored portions of a continuous wire wound on a reel.

The system according to the invention essentially relates to pins formed from separable portions of a continuous wire wound around a reel, that is to say the portions are arranged one after another and linked together by frangible regions of smaller cross section, forming "notches".

A system for fitting pins based on the portions of a continuous wire coming from a reel has already been taught by United States patents 4,176,448 and 4,318,964.

This system makes it possible to unwind the wire portions one by one, then to separate the first end portion from the rest of the continuous wire and, finally, to insert said separated portion into the hole in the connector support. Although this system is widely used, it does nevertheless have drawbacks.

This is because it comprises a cutting mechanism of the punch type for separating the end portion from the rest of the continuous wire, which acts, perpendicular to the axis of the portion, on the frangible region in question by drawing. Since the continuous wire forming the pins is made of a soft conductive material (brass, bronze, etc.), the frangible region does not break cleanly, thereby leaving a burr remaining on the end of the pins. This is all the more important as it is difficult to place the notch defining the frangible region in the optimum position with respect to the punch of the mechanism, on account of the length tolerances on the portions forming the future pins. Thus, such burrs may impair the actual connection operation and result in subsequent malfunctions.

Moreover, another drawback with this prior system stems from the arrangement of the punch mechanism, located near the end portion to be separated from the rest of the wire, which results in a bulky mechanical system near the insertion gripper and, in addition, excludes the possibility of fitting several pins simultaneously, especially pins with the currently required pitches which are less than 2 millimeters between two adjacent pins. A fortiori, connectors with right-angled pins, which comprise several rows for firstly fitting straight, rectilinear pins of length decreasing from one row to another and then fitting 90°-angled pins in a subsequent operation, cannot be handled by the system described in the aforementioned patents.

This system has other drawbacks. In particular, it is relatively slow since it is limited to the insertion of a single pin at a time. The use of a drawing-punch mechanism is also noisy and causes cyclic shocks and vibrations which are always deleterious for the actual system and its adjustments, as well as the accumulation of metal particles produced by the punch mechanism during the operation of separating the portions. The punch must also be changed regularly.

The object of the present invention is to remedy these drawbacks and relates to a system which allows, especially, separation of the portions without a burr and without having to use strict indexing at the frangible region, simultaneous fitting of several pins, which may have different lengths and cross sections, and any fitting configuration of said pins (for example, four aligned pins or four pins forming the vertices of a square with one pin in the center, etc.).

For this purpose, the system for fitting, into a device such as, especially, a connector, pins formed by portions of a continuous wire which are separable at frangible regions connecting them together one after another is, according to the invention, one wherein:

there are included:

a unit for the step-by-step advancing and the guiding of said continuous wire and a a unit for fitting said wire portions into said device; and said units are movably mounted, one with respect to the other, so that they can move, one with respect to the other, thereby separating, by fracturing the corresponding frangible region, said end portion from the rest of the wire, from a first, loading position in which the end portion of said continuous wire is introduced into said fitting unit via said advancing and guiding unit to a second, fitting position in which said end portion of said wire, separated from the rest of said wire, is able to be fitted into said device, and vice versa.

Thus, by virtue of the design of the system in terms of two, advancing and fitting, units which can move with respect to each other, the separation of the end portion from the rest of the wire is achieved by a simple relative movement between the two units, which causes the frangible region to fracture, this being so without recourse to any cutting mechanism, such as a punch mechanism. As a result there is no burr, no noise and no vibrations, and the system requires less maintenance, thereby guaranteeing greater operating reliability of the system according to the invention. Moreover, the absence of a cutting mechanism near the portion to be separated makes it possible to fit pins (separated portions) which are arranged on small pitches, and even, simultaneously, several pins that may have different lengths and cross sections, without being impeded by such a cutting mechanism, since the space around said units is therefore free.

Preferably, in said first position, the two units are aligned so that said end portion introduced into the fitting unit and said rest of the wire guided in the advancing unit have a rectilinear configuration defining the direction of advance of said wire and so that, in said second position, after a relative movement between said units which has caused the corresponding frangible region to fracture, said fitting unit lies transversely to said advancing unit in order to allow said end portion to be fitted into said device.

In particular, said relative movement between said units consists of a rotation of the fitting unit about an axis perpendicular to the direction of advance of said wire, in order to bring said fitting unit from the first position, aligned with the advancing unit, to the second position, perpendicular to the previous one.

Structurally, the two units are supported by a frame, said fitting unit being mounted on a rotary shaft linked to said frame and perpendicular to the direction of advance of said wire, so as to allow, due to the action of driving means, said fitting unit to pass from the first position to the second position and vice versa.

Advantageously, the two units are linked to each other so that, during passage from the first position to the second position, the advancing unit follows the fitting unit in order to allow said frangible region between said corresponding portions to fracture smoothly. Thus, the separation takes place gradually and cleanly, making it possible to obtain spins which have a profile devoid of any roughness and which have not undergone deformation.

In this case, said linkage between the two units is defined by a hinge pin parallel to said rotary shaft and opposite said frangible region between said end portion, housed in the fitting unit, and said rest of the continuous wire, housed in the advancing unit, and said advancing and guiding unit is mounted so as to pivot about a pivot pin, parallel to said hinge pin and carried by a slide which can slide along said frame, perpendicular to said pivot and hinge pins. Said pivot pin is preferably located to the rear of said advancing and guiding unit, on the opposite side from said hinge pin of the units, which is located in front of said advancing unit. The advancing and guiding unit therefore executes an oscillating and sliding movement, in the manner of a piston rod of an internal combustion engine.

Moreover, said advancing and guiding unit comprises at least one longitudinal guiding channel which houses said wire and a controllable advancing mechanism which interacts with the latter in order to ensure that said continuous wire advances step by step. Several longitudinal channels may be arranged in parallel with each other, each so as to contain a continuous wire. Several end portions may thus be separated, to be housed in the fitting unit and fitted into the socket of the connector. Of course, there may be any number and any arrangement of said channels, depending on the requirements, for example it would be possible to have two, three, four or more channels arranged in a row, in a triangle, in a square, in quincunx, etc., without departing from the scope of the invention, thereby making it possible to simultaneously fit several pins (separated end portions) into the socket of the connector.

In a preferred embodiment, said fitting unit comprises a support associated with said rotary shaft and a fitting head mounted so as to slide on said support and provided, at its end facing said advancing unit in the first position, with at least one housing in which said end portion of the wire may be housed. If the advancing unit is provided with several channels, each housing a continuous wire, the fitting head is then provided with several corresponding housings.

Moreover, said system comprises means for actuating the sliding of said fitting head so as to ensure that said end portion is introduced into said device when said fitting unit occupies the second position.

Moreover, said actuating means may comprise a cam driven in rotation and connected, via a synchronization mechanism, to the rotary shaft supporting said fitting unit, so that, when the latter occupies said second position, the action of the cam causes said head to slide toward said device for fitting said portion.

Furthermore, retention means ensure that said end portion is immobilized in said housing in said fitting head, right from the separation of said portion from the rest of the wire up to its being fitted. Advantageously, said retention means are of the suction type and comprise a source of fluid supply interacting with said housing via a duct made in said fitting head.

In addition, it is provided with a springy return element between said support and said head of the fitting unit in order to bring said head back into the inactive position after said portion has been fitted.

The figures of the appended drawing will clearly explain how the invention may be realized. In these figures, identical references denote similar elements.

Figure 1:
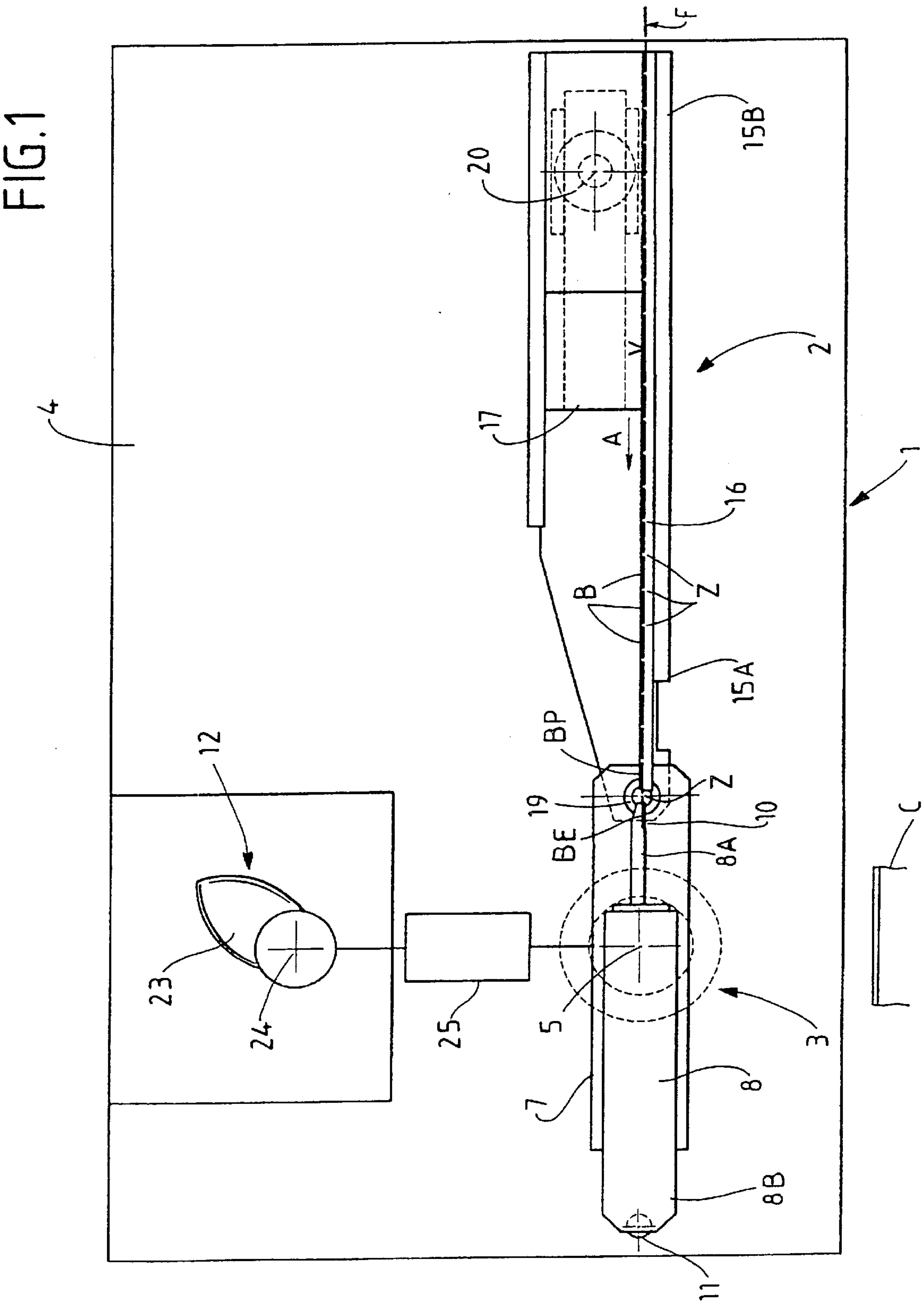
FIG. 1 shows, in plan view, the system for fitting pins according to the invention, in the first position of said advancing and fitting units.
Figure 2:
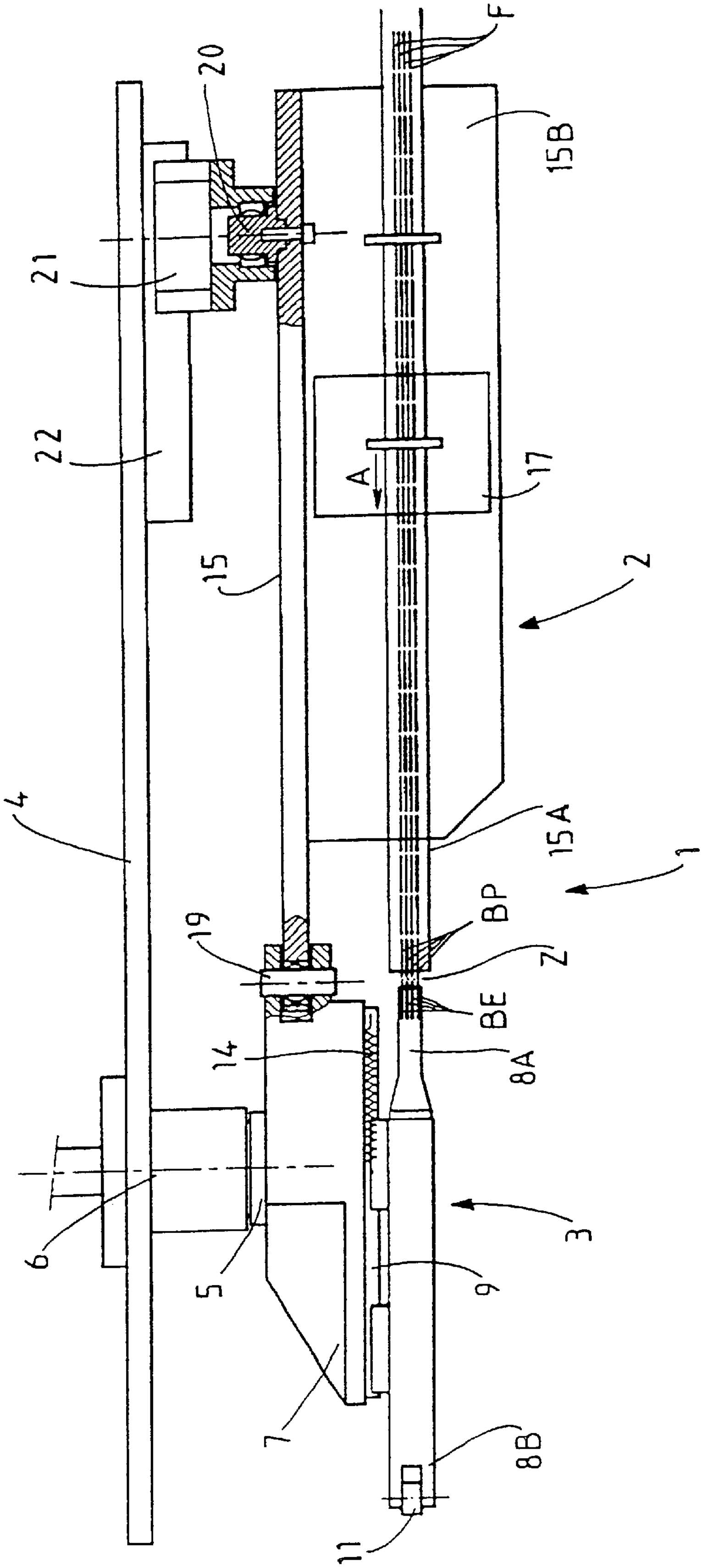
FIGS. 2 and 3 are top and side views, respectively, of said system illustrated in FIG. 1.
Figure 3:
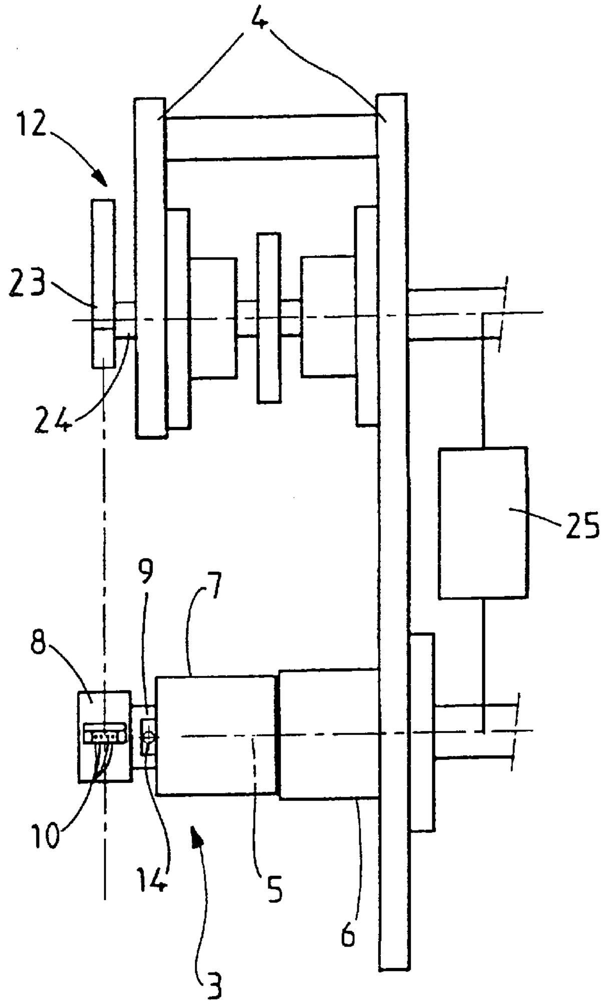
Figure 4:
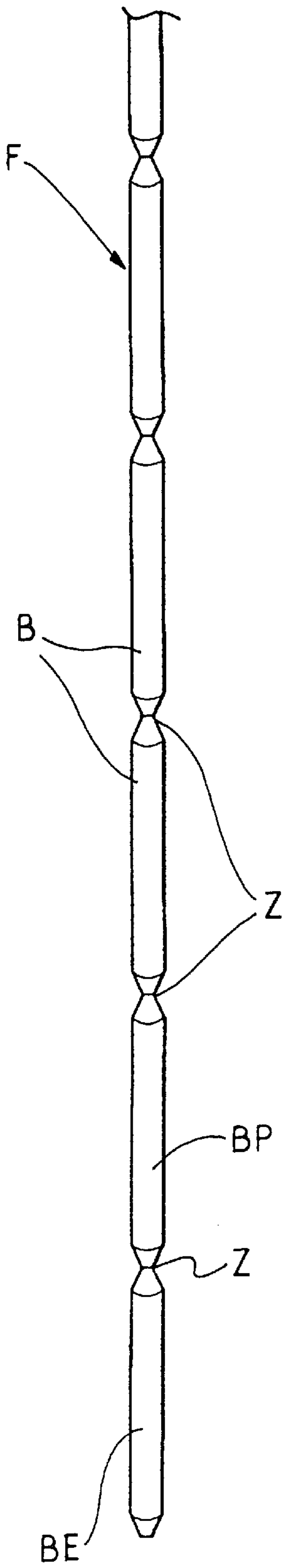
FIG. 4 shows, partially, a continuous wire consisting of successive portions forming the pins to be fitted.

The purpose of the system 1 shown in FIGS. 1 to 3 is to fit or insert pins B into the holes in a connector C which is ready to interact, subsequently, with another connector having complementary pins. In order to supply the system 1 with pins B, the latter are formed, as shown in FIG. 4, by identical portions of a continuous wire F, these portions being joined together one after another by frangible regions Z of lower strength, forming "notches". The continuous wire F of portions comes from a reel, not shown but in a manner known per se, and is unwound step by step by the system 1 as will be seen subsequently, in order to separate the end pin or portion BE from the rest of the wire F and fit it into the corresponding hole in the connector.

In the example shown, the system 1 can house four continuous wires, arranged in parallel (in a horizontal row), in order simultaneously to fit, at each operating cycle, four pins into corresponding holes in the connector in question. Of course, the number of continuous wires and their arrangement (aligned, in a triangle, in a square, in quincunx, etc. could be different, depending on the requirements, without departing from the scope of the invention.

The system 1 according to the invention includes a unit 2 for the step-by-step advancing and the guiding of said continuous wires F in a direction of advance A and a unit 3 for fitting said end pins of the wires F into the connector.

The two units 2 and 3 are supported by a frame 4 in the form of a plate and they are movably mounted, one with respect to the other, in order to occupy, reversibly, a first, loading, extreme position (FIGS. 1 to 3) in which the end portions or pins BE of the four parallel wires F are introduced into the fitting unit 3 by the advancing unit 2 and, after movement one with respect to the other and fracture of the corresponding frangible regions, a second, fitting, extreme position (FIGS. 9 and 10) in which the end pins BE of the wires, separated from the rest of the four wires F are capable of being fitted into the corresponding holes in the connector C.

In the illustrative embodiment of said system 1, the fitting unit 3 is mounted on a rotary shaft 5 linked to the frame 4 and perpendicular to the direction of advance A of said wires. This rotary shaft is linked to a drive motor 6 fastened to the frame 4, the plate of which is arranged in a vertical plane in the figures, so that the geometrical axis of said shaft 5 is horizontal.

In particular, the fitting unit 3 is composed of a support 7 associated with the rotary shaft 5 and of a fitting head 8 which is mounted so as to slide on a slideway 9 provided on the support 7 and placed perpendicular to the geometrical axis of said shaft 5. The head 8 has a tapered end 8A in which four parallel housings 10, intended to house the end pins BE of the wires, are made. The other end 8B of the head is provided with a wheel 11 capable of interacting with means 12 for actuating the sliding of the fitting head 8 with respect to the support 7 and thus of allowing the pins to be inserted into the connector. Means 13 for keeping the separated pin in position in the respective housing 10 are provided and comprise a source of fluid suction (not shown), connected to the housing 10 via a duct 8C made in the head 8. Moreover, an elastic return element 14, such as a spring, is provided between the support and the head, parallel with the direction of sliding of the latter in the support.

The advancing and guiding unit 2 comprises a support 15 which has four longitudinal and parallel channels 16 in which the continuous wires F coming from the reels (not illustrated) are arranged. These four channels may consist of tubes or ducts, or of guide slots or grooves forming, in all cases, channels 16 for guiding said aligned portions of wires F.

The synchronized step-by-step advancing of the wires at each operating cycle of the system 1 is provided by an advancing mechanism 17 of the type with runners or with pawls, shown symbolically in the figures and interacting, for example, with the frangible region Z between two consecutive portions of each wire in order to make it advance by one step, equal to the length of said portions, toward the fitting unit (of course, it would be possible to provide, in special fitting cases, an independent advance for each wire or groups of wires).

To do this, the advancing unit 2 and fitting unit 3 are aligned in the first, loading position so that the channels 16 in the unit 2 and the housings 10 in the unit 3 are in correspondence and in the respective elongation of each other.

Figure 5:
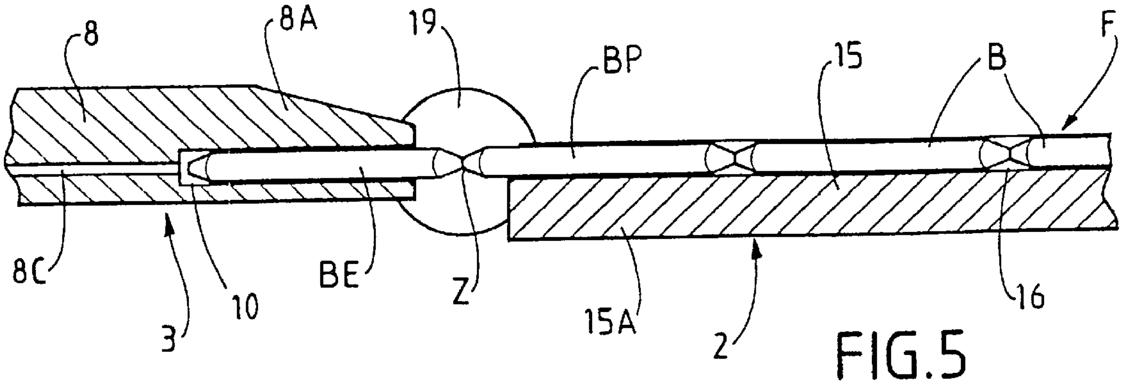
FIG. 5 is an enlarged view of FIG. 1 showing the arrangement of the pins in the first position of said units.

It should be pointed out, especially in FIG. 5, that the facing ends 8A and 15A of the aligned units are a certain distance apart and that the frangible region Z between the end pin BE located in the housing 10 and the penultimate pin BP guided in its channel 16 lies in the space between the units, almost the whole of the pins BE and BP being confined in the housing and the corresponding channel of said respective units.

In addition, the two units 2, 3 are linked to each other in order to ensure the desired kinematic behavior of the system 1. In this example, the linkage between the units is defined by a hinge pin 19 which links the two supports 7 and 15 and is parallel to the rotary shaft 5. Moreover, this hinge pin 19 lies approximately in the perpendicular extension of the frangible region Z between the two end pins BE and BP of said wires.

In order to allow the advancing and guiding unit 2 to follow the rotation of the fitting unit 3, on account of its linkage to the latter via said hinge pin, said advancing and guiding unit 2 is mounted so as to pivot about a pivot pin 20 which is parallel to the hinge pin 19 and which is carried by a slide 21 which can slide in a slideway 22 which is integral with the frame and the direction of sliding of which is perpendicular to the pivot and hinge pins. This pivot pin 20 is located at the rear end 15B of the unit 2, the front end 15A of which faces the fitting unit 3.

Thus, the guiding unit 2 may be compared with the connecting rod of an internal combustion engine, the crankshaft of which would be the fitting unit 3 and the piston the slide 21.

The means 12 for actuating the sliding of the fitting head 8 comprise, in this illustrative example, a cam 23 mounted on a shaft 24 which is supported by the frame and lies parallel to the rotary shaft 5 of the fitting unit, vertically in line with said rotary shaft. The shaft 24 of the cam 23 is mechanically linked to the rotary shaft 5 via a suitable synchronization mechanism 25, so that action by the cam on the fitting head of the unit is possible only when said fitting head occupies the second position, as will be seen later.

The operation of the fitting system 1 according to the invention takes place as follows.

Firstly, it is assumed that the system 1 is in the first, loading, extreme position illustrated in FIGS. 1, 2, 3 and 5, corresponding to the start of an operating cycle. In this first position, the two units are aligned horizontally so that the housings 10 in the fitting unit 8 lie in the extension of the channels 16 for guiding the wires F. The end pins BE of the latter are brought, via the advancing mechanism 17, into the housings in the fitting head, which is in an inactive position with respect to the support 7, due to the action of the return spring 14. The four frangible regions Z are then located between the two units and are approximately aligned with the hinge pin 19 of the units.

Figure 8:
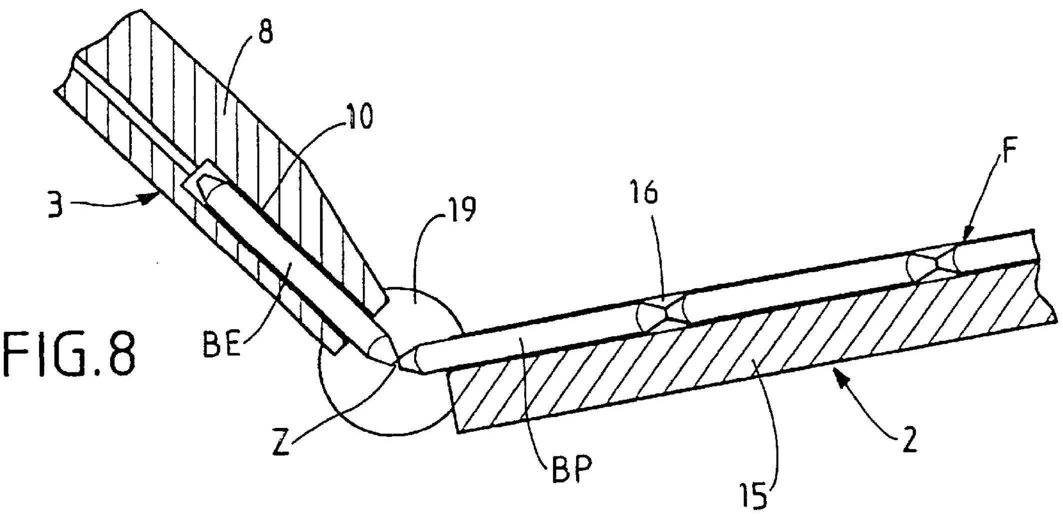
FIG. 8 is an enlarged view of FIG. 6, showing the process of fracturing the end portion with respect to the rest of said continuous wire.
Figure 6:
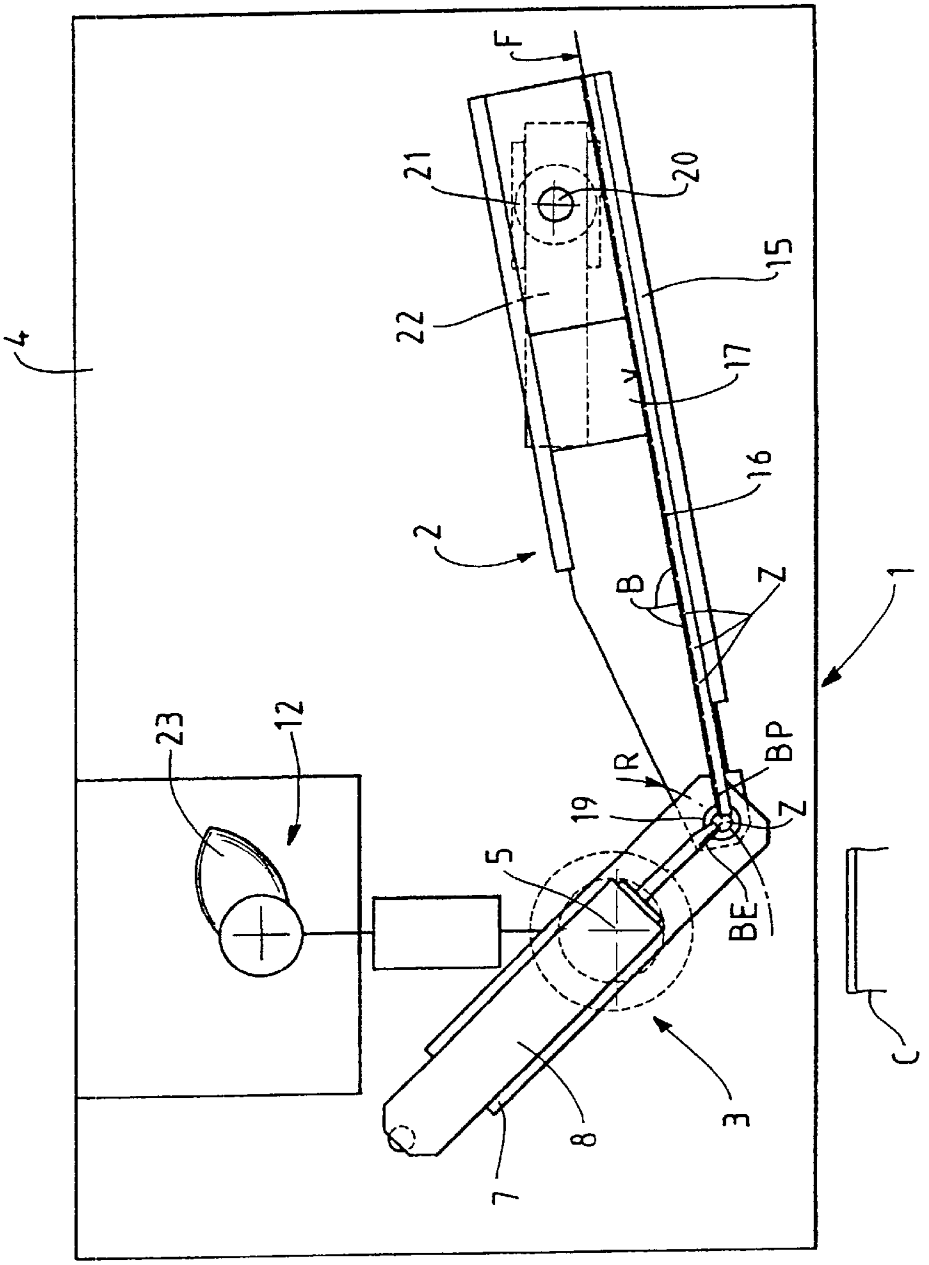
FIGS. 6 and 7 are plan and side views of said system when said units pass from the first position to the second position.
Figure 7:
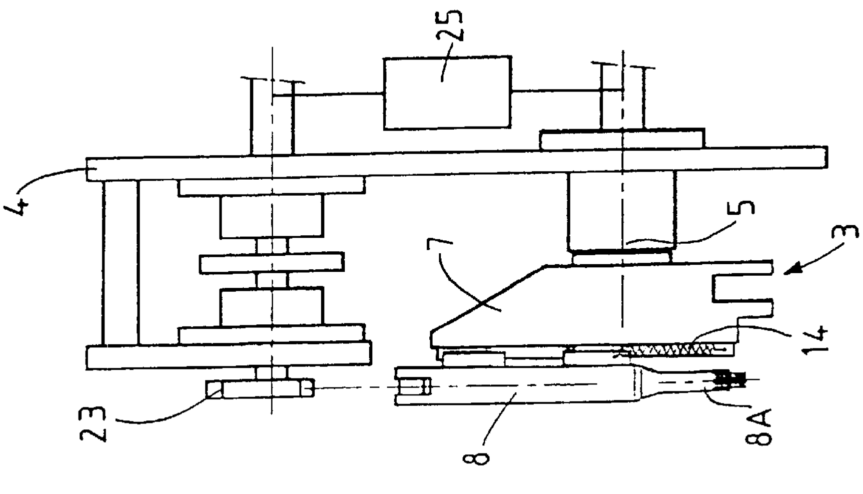

At this moment, the motor 6, by means of its rotary shaft 5, causes the fitting unit 3 to rotate in the direction of the arrow R and to pass from its horizontal position to a vertical position. FIGS. 6, 7 and 8 show an intermediate position of the fitting unit 3 which, by means of the hinge pin 19, causes the advancing unit 2 together with itself to undergo an oscillating and sliding movement in the manner of a connecting rod of an internal combustion engine. The front of the advancing unit 2 follows the rotary path described by the hinge pin 19, while the rear of the advancing unit follows a straight path along the slideway 22-slide 21 connection, while pivoting about the pivot pin 20. During this movement, the end pins BE, located in the housings in the unit 3, and the remaining parts of the continuous wires F, located in the channels 16 in the unit 2, gradually bend at their frangible regions Z, so as to pass from an aligned state to a bent state. In FIGS. 6, 7 and 8, the frangible region Z is starting to gradually break.

Figure 11:
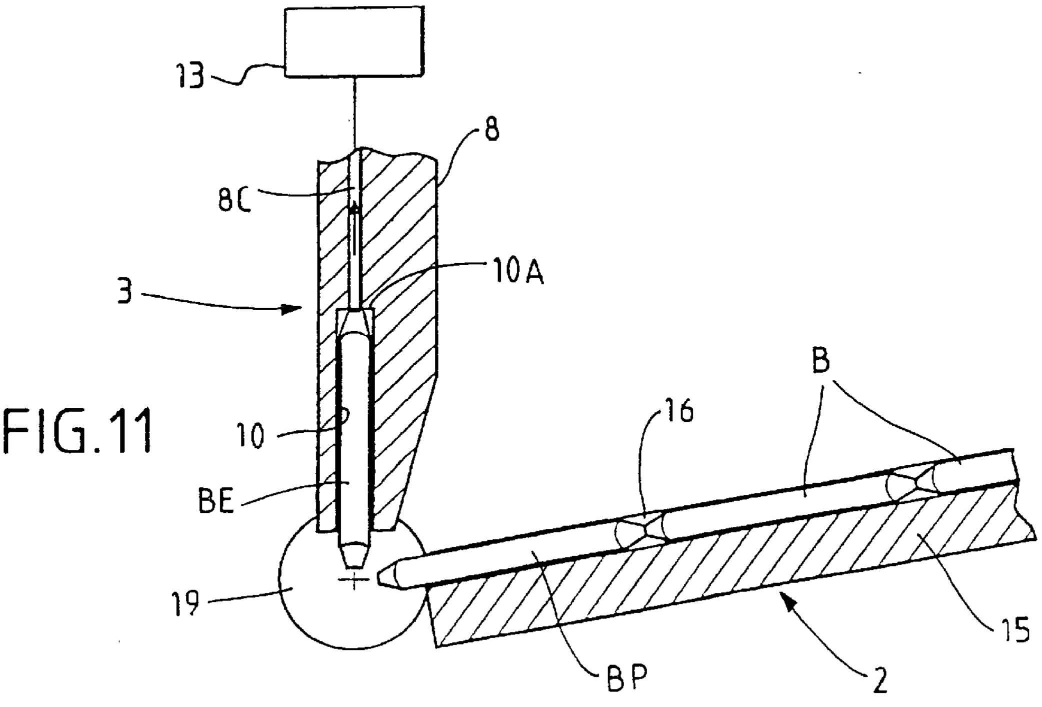
FIG. 11 is an enlarged view of FIG. 9, after the end portion has been fractured and before it is fitted into the hole in a connector.
Figure 9:
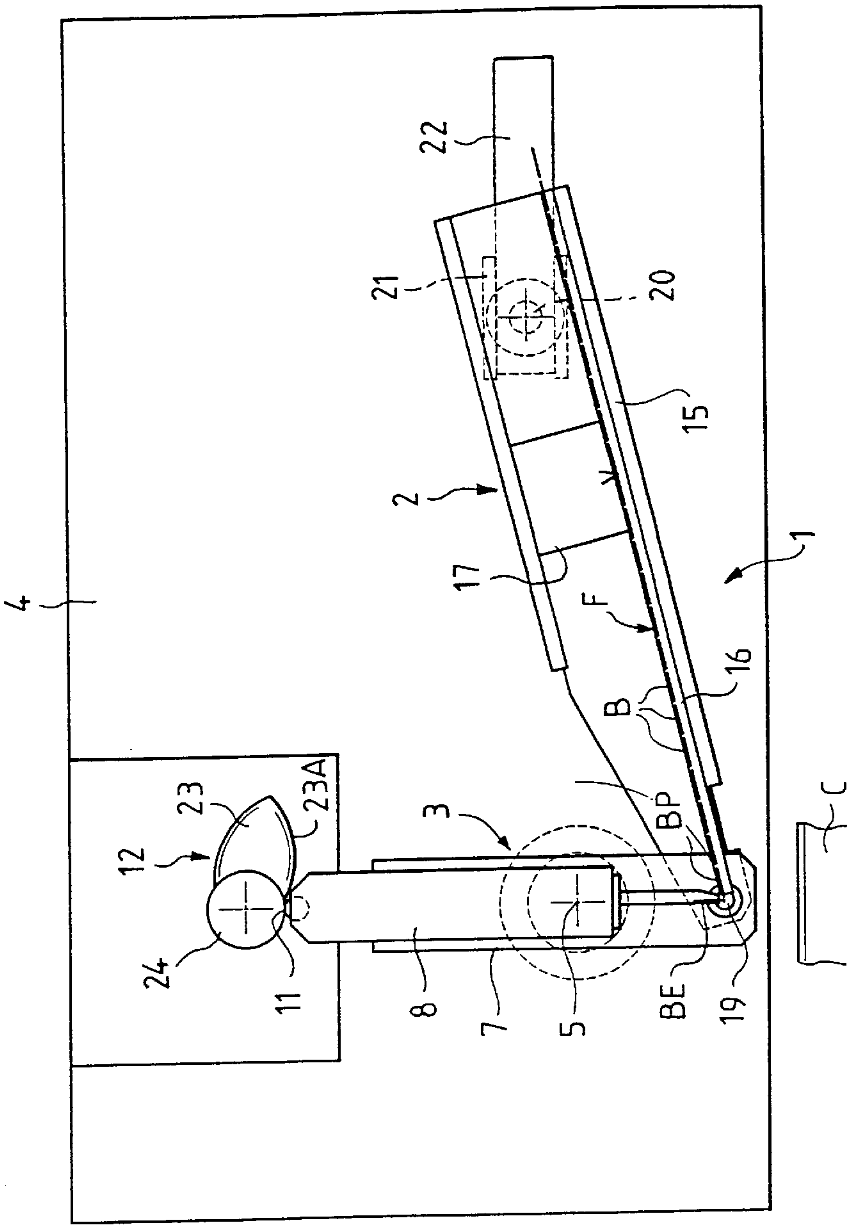
FIGS. 9 and 10 are plan and side views of said system when said units occupy the second position.
Figure 10:
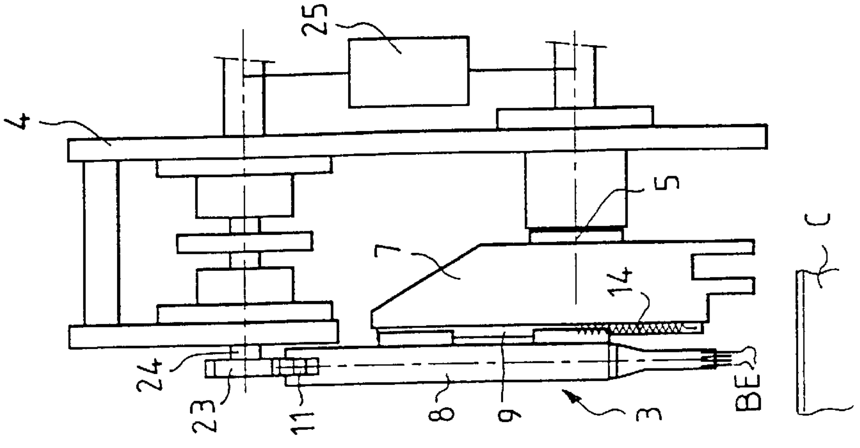

The rotation R of the fitting unit 3 continues until it causes the frangible region Z of each end pin BE to break from the rest of the continuous wire F, before the fitting unit occupies its second extreme position, for which it is vertical, after an effective 90° rotation, as shown in FIGS. 9, 10 and 11.

By virtue of the linkage between the units and of the rotation and oscillation movements which stem therefrom, the fracture of the frangible regions Z, leading to the separation of the two consecutive pins BE and BP in question, takes place gradually and cleanly without creating a burr or deforming said pins.

Before the fitting unit 3 reaches the second position, the retention means 13 (FIG. 11) act so as to immobilize, by suction via the duct 8C, each separated pin in its respective housing 10 and, more particularly, against the bottom 10A of the latter. Thus, the pins BE are held in the housings 10 when the fitting unit 3 occupies its second position.

As the fitting unit passes from the first position to the second position, the shaft 24 carrying the cam 23 has rotated via the synchronization mechanism 25 so that the cam 23 only comes into contact with the wheel 11 of the fitting head when the support for the fitting unit reaches the second, fitting position (FIGS. 9, 10).

Figure 12:
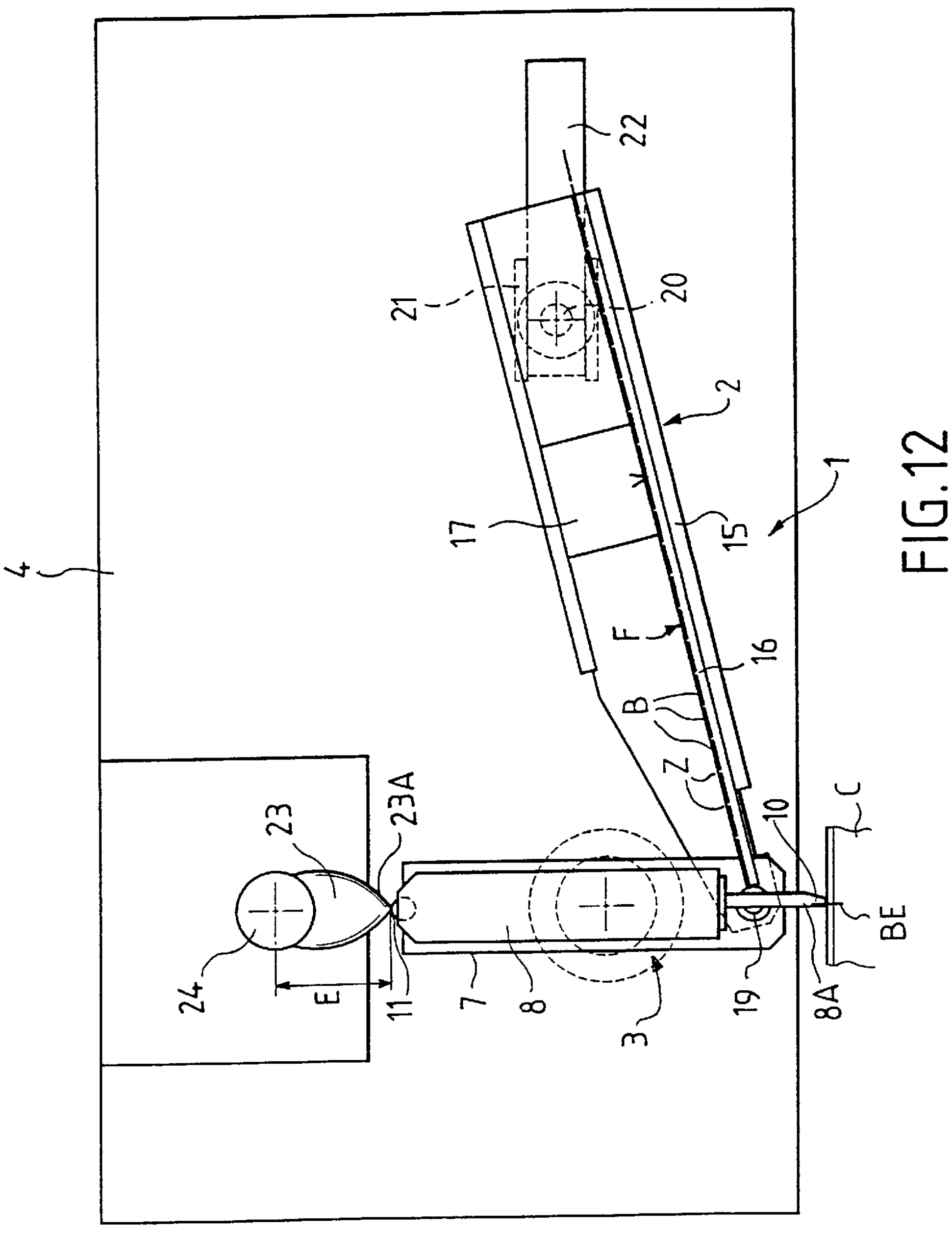
FIGS. 12 and 13 are plan and side views of said system showing the action of the actuating means on said fitting unit in order to introduce said end portion into said connector.
Figure 13:
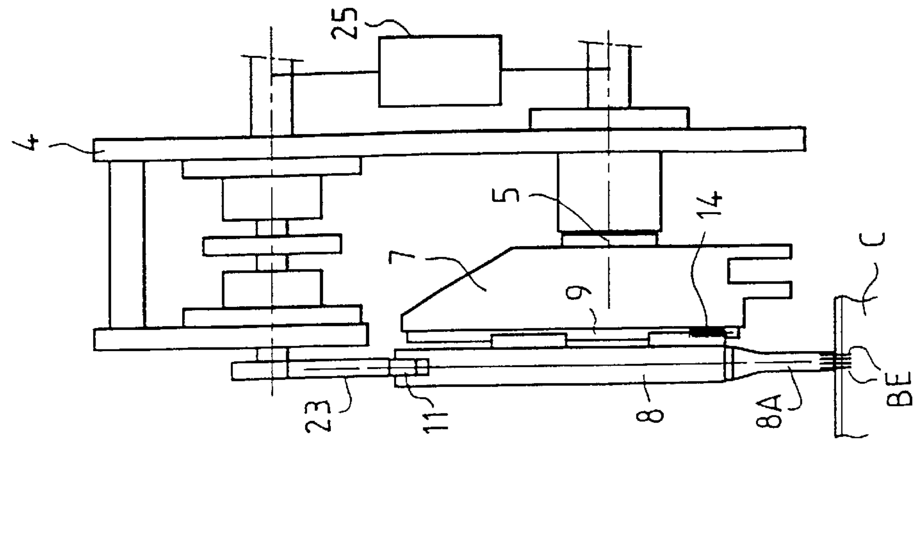

The cycle of the system 1 then continues, the units 2 and 3 are immobilized in position by the motor 6 stopping, while the profile 23A of the cam "attacks" the fitting head 8 which then slides with respect to its fixed support, toward the connector C shown symbolically in FIGS. 12 and 13. In order not to impede the sliding of the fitting head 8 in its downward vertical movement, the advancing unit 2 is set back slightly with respect to return means (not shown), or it then ceases to "follow" the fitting unit 3 as soon as the end portion is separated by virtue of elastic stop means (not shown) provided for example between the pin 19 and the advancing unit 2. Of course, the position of the connector C is such that its housing holes are facing the pins to be fitted. During the downward movement of the head 8, passing from its inactive position to its active position, due to the action of the profile of the cam, the spring 14 is compressed and the end of each of the pins BE engages in the corresponding hole in the connector C until said pins are fully installed. Of course, the means for retaining the pins are deactivated beforehand. In the position illustrated in FIG. 12, the eccentricity E of the cam with respect to the geometrical axis of its shaft 24 is thus at a maximum, the head being in the active low position, compressing the spring 14.

Figure 14:
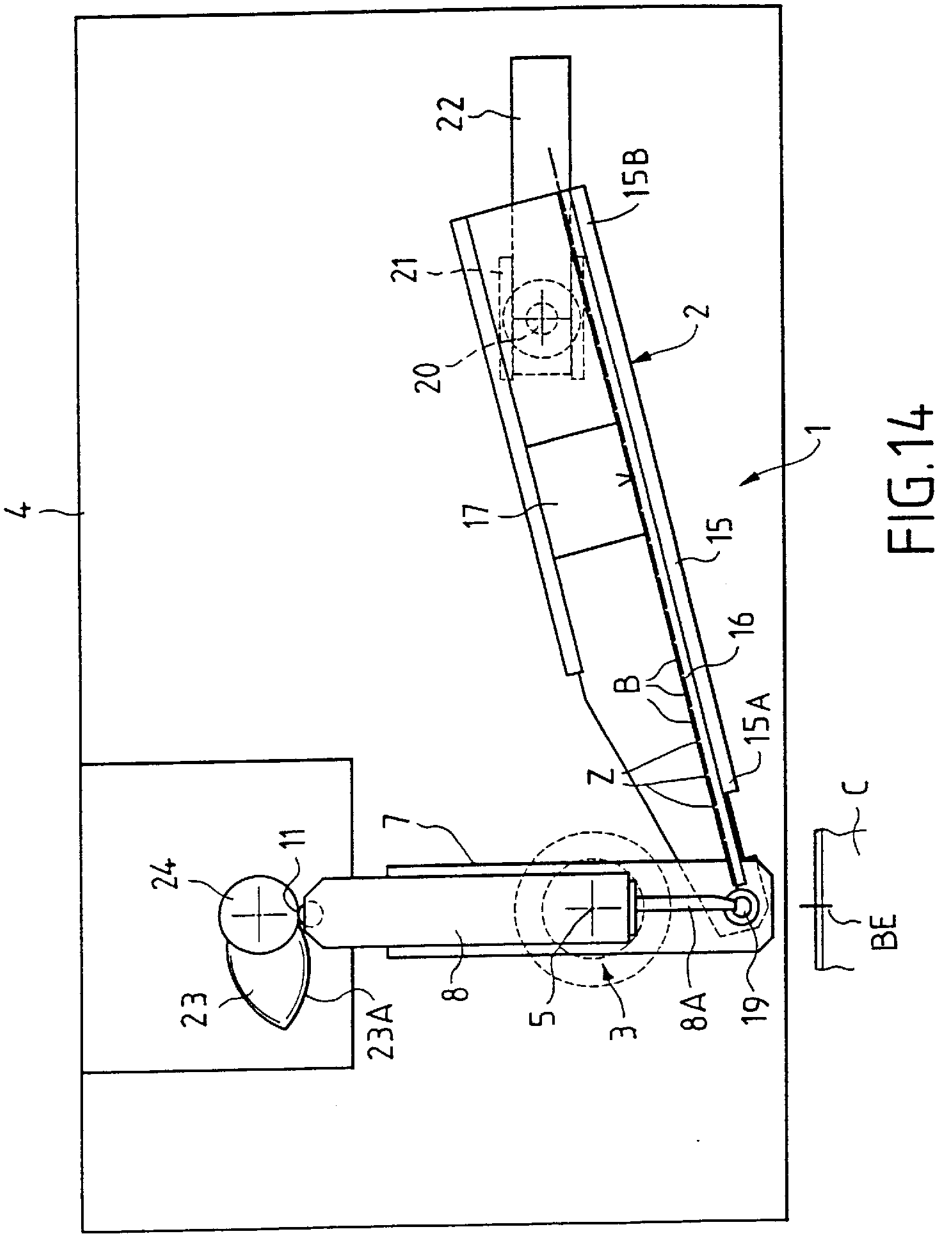
FIGS. 14 and 15 are plan and side views of said system after said fitting unit has been brought back into the inactive position and before said units have been returned to the first position.
Figure 15:
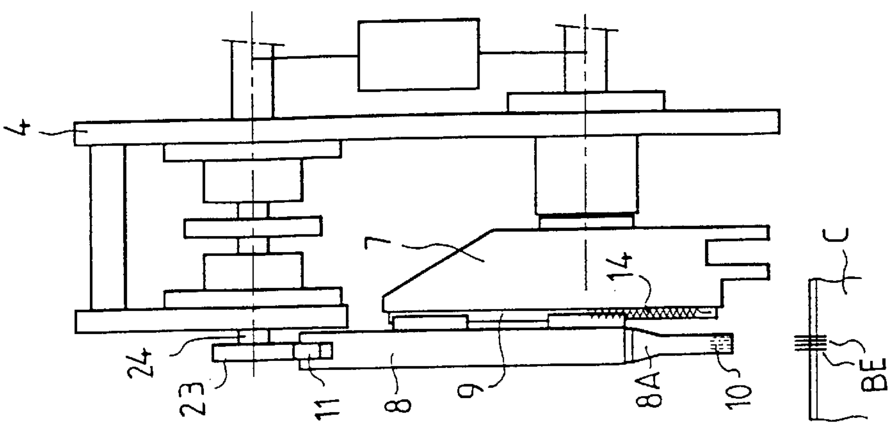

Next, the cam 23 continues its rotation so that its eccentricity E decreases, causing the head 8 to return to its high inactive position, due to the action of the spring 14 which relaxes (FIGS. 14 and 15). The profile 23A of the cam 2 leaves the wheel of the fitting head, which is then in the vertical high position, and the motor 6 of the shaft 5 is actuated again, in the opposite direction to the previous one, in order to bring the two units 2 and 3 back into the position illustrated in FIGS. 1 to 3 and thus to complete the operating cycle of the system 1.

The advantages of the system according to the invention may be summarized as follows:

perfect cutting-through of the portions, since the separation by gradual bending at the frangible region does not involve transverse forces and therefore does not result in the formation of burrs;

no requirement for very accurate indexing of the center of the frangible regions on the axis of rotation in order to separate the portions; the latter remain free in the housings in the fitting head and independently position themselves perfectly along the rotation axis; since there is no specific cutting mechanism, it is possible to feed portions placed a very short distance apart, and there is nothing to prevent several sections, possibly having different lengths and cross sections, being fitted simultaneously, this being very useful in the case of connectors with right-angled outputs;

all these criteria together make it possible to achieve manufacturing rates higher than those obtained by the aforementioned prior system, while improving the quality of the ends of the pins;

the absence of a cutting element in the system also has other advantages, such as:

no cutting residues, reduced maintenance because there are no punches to be changed;

no percussion on the portion at the time of cutting, which means the mechanism is completely silent.

What is claimed is:

1. A system for fitting at least one pin into a connector, said system comprising:

a frame;

a first unit supported by said frame and fed with a continuous wire having a plurality of portions, said continuous wire including an end portion, each of said plurality of portions being arranged one after another and linked together by frangible regions at which each of said plurality of portions is separable one from another to form said at least one pin, said first unit advancing and guiding said continuous wire along a rectilinear direction of advance;

a second unit supported by said frame and mounted on a rotary shaft, said rotary shaft being perpendicular to said rectilinear direction of advance, said second unit being for fitting said at least one pin into said connector; and a driving means for rotating said second unit around said rotary shaft from a first position to a second position, wherein:

a. in said first position, said first and second units are aligned along said rectilinear direction of advance of said continuous wire so that said end portion of said continuous wire is introduced into said second unit by said first unit along said rectilinear direction of advance of said continuous wire, b. rotation of said second unit from said first position to said second position causes separation of said end portion from said continuous wire by fracturing one of said frangible regions to form said at least one pin, and c. in said second position, after said rotation of said second unit which has caused said end portion to be separated from said continuous wire to form said at least one pin, said second unit is transverse to said rectilinear direction of advance of said continuous wire of said first unit in order to allow said at least one pin to be fitted into said connector.

2. A system as claimed in claim 1, further comprising a linkage for linking said first and second units to one another so that, during said rotation of said second unit from said first position to said second position, said first unit follows said second unit in order to allow said end portion to be separated smoothly from said continuous wire.

3. A system as claimed in claim 2, further comprising a hinge pin parallel to said rotary shaft, a pivot pin disposed parallel to said hinge pin and a slide which can slide along said frame perpendicular to said pivot and hinge pins, and wherein:

said linkage between said first and second units is defined by said hinge pin; and said first unit is mounted on said frame so as to pivot about said pivot pin and be carried by said slide which slides along said frame perpendicular to said pivot and hinge pins.

4. A system as claimed in claim 3, wherein:

said hinge pin is located on a first side of said first unit; and said pivot pin is located on a second side of said first unit opposite said first side.

5. A system as claimed in claim 1, wherein said first unit further comprises:

at least one longitudinal guiding channel for containing and guiding said continuous wire, and a controllable advancing mechanism that interacts with said continuous wire contained in said guiding channel so that said continuous wire advances one of said plurality of portions after another.

6. A system as claimed in claim 1, wherein said second unit further comprises:

a support associated with said rotary shaft, and a fitting head for fitting said end portion into said connector and slidably mounted on said support, said fitting head having a terminal portion that faces said first unit when in said first position and comprising at least one housing for housing said end portion of said continuous wire.

7. A system as claimed in claim 6, further comprising means for actuating sliding of said fitting head so that said end portion of said continuous wire is introduced into said connector when said second unit occupies said second position.

8. A system as claimed in claim 7, further comprising a synchronization mechanism and wherein said actuating means comprises a cam for being driven in rotation, said cam being connected to said rotary shaft via said synchronization mechanism so that when said second unit is in said second position, said rotation of said cam causes said fitting head to slide toward said connector for fitting said end portion into said connector.

9. A system as claimed in claim 6, wherein said at least one housing further comprises retention means for immobilizing said end portion when said end portion is housed within said at least one housing.

10. A system as claimed in claim 9, wherein said retention means are of the suction type and comprise a source of fluid supply that interacts with said at least one housing via a duct in said fitting head.

11. A system as claimed in claim 6, further comprising a springy return element between said support and said fitting head of said second unit, wherein said fitting head is brought to an inactive position by said springy return element after said end portion has been fitted into said connector.

* * * * *